(12) United States Patent
Hambitzer et al.

(10) Patent No.: US 8,981,683 B2
(45) Date of Patent: Mar. 17, 2015

(54) HIGH-CURRENT BATTERY SYSTEM AND METHOD FOR CONTROLLING A HIGH-CURRENT BATTERY SYSTEM

(75) Inventors: Guenther Hambitzer, Bonn (DE); Joachim Heitbaum, Bonn (DE); Markus Borck, Stuttgart (DE); Christiane Ripp, Pfinztal (DE)

(73) Assignee: Alevo Research AG, Zug (CH)

( * ) Notice: Subject to any disclaimer, the term of this patent is extended or adjusted under 35 U.S.C. 154(b) by 220 days.

(21) Appl. No.: 13/577,583

(22) PCT Filed: Feb. 8, 2011

(86) PCT No.: PCT/EP2011/051769
§ 371 (c)(1),
(2), (4) Date: Aug. 7, 2012

(87) PCT Pub. No.: WO2011/095630
PCT Pub. Date: Aug. 11, 2011

(65) Prior Publication Data
US 2012/0313560 A1    Dec. 13, 2012

(30) Foreign Application Priority Data
Feb. 8, 2010 (EP) .................................. 10001270

(51) Int. Cl.
*G01R 31/36* (2006.01)
*H01M 10/42* (2006.01)
(Continued)

(52) U.S. Cl.
CPC ........ *H01M 10/4207* (2013.01); *H01M 10/482* (2013.01); *H02J 7/0021* (2013.01); *H02J 7/0026* (2013.01); *B60L 11/1851* (2013.01);
*H01M 10/052* (2013.01); *H01M 10/0563* (2013.01); *H01M 2200/00* (2013.01);
(Continued)

(58) Field of Classification Search
CPC .......................... H01M 10/052; H01M 10/4207
USPC ................................... 318/139, 558; 324/434
See application file for complete search history.

(56) References Cited

U.S. PATENT DOCUMENTS 4,287,267 A     9/1981  Whittlesey et al.
5,982,652 A  * 11/1999  Simonelli et al. ............. 363/142
(Continued)

FOREIGN PATENT DOCUMENTS

DE     102004013351    10/2005
EP         1728305     11/2007
(Continued)

*Primary Examiner* — David S Luo
(74) *Attorney, Agent, or Firm* — Bose McKinney & Evans LLP

(57) ABSTRACT

The present invention relates to a high power battery system having a battery system monitoring electronics and battery modules being electrically connected in series via an operating current line. At least one battery module is a bypass battery module comprising a bypass switch and a bypass line for electrically bypassing the battery module. For each bypass battery module a module monitoring unit of the monitoring electronics monitors the assigned battery module and detects a fault state. In the fault state, the battery system monitoring electronics measures the current flow in the operating current line connecting the battery modules and switches the bypass switch of the bypass battery module concerned from a normal operating position to a bypass position at a time when the current flow in the operating current line is lower than a predetermined limit value.

22 Claims, 4 Drawing Sheets

(51) Int. Cl.
  *H01M 10/48* (2006.01)
  *H02J 7/00* (2006.01)
  *B60L 11/18* (2006.01)
  *H01M 10/052* (2010.01)
  *H01M 10/0563* (2010.01)

(52) U.S. Cl.
  CPC ...... *H01M 2300/002* (2013.01); *Y02T 10/7011* (2013.01); *Y02T 10/7055* (2013.01); *Y02T 10/7005* (2013.01); *Y02T 10/705* (2013.01)
  USPC .......................... 318/139; 318/558; 318/434

(56) References Cited

U.S. PATENT DOCUMENTS

| | | | |
|---|---|---|---|
| 6,730,441 | B1 | 5/2004 | Hambitzer et al. |
| 7,843,676 | B2 * | 11/2010 | Klikic et al. ................. 361/93.1 |
| 2002/0074861 | A1 | 6/2002 | Lopez |
| 2007/0065714 | A1 | 3/2007 | Hamitzer et al. |
| 2007/0212596 | A1 | 9/2007 | Nebrigic et al. |
| 2008/0084182 | A1 | 4/2008 | Oberlin et al. |
| 2010/0062341 | A1 | 3/2010 | Hambitzer |
| 2010/0259224 | A1 | 10/2010 | Zinck et al. |

FOREIGN PATENT DOCUMENTS

| | | |
|---|---|---|
| EP | 1923934 | 5/2008 |
| JP | 4017831 | 1/1992 |
| WO | WO 96/22625 | 7/1996 |
| WO | WO 00/79631 | 12/2000 |
| WO | WO 2005/031908 | 4/2005 |
| WO | WO 2009/077140 | 6/2009 |

* cited by examiner

HIGH-CURRENT BATTERY SYSTEM AND METHOD FOR CONTROLLING A HIGH-CURRENT BATTERY SYSTEM

This application is a 371 of PCT/EP2011/051769 filed Feb. 8, 2011, which claims priority to European App. No. 10001270.7 filed Feb. 8, 2010. The entire contents of the above-identified applications are hereby incorporated by reference.

The present invention relates to a high power battery system in which a large current flows and which is suitable in particular for vehicle drivetrains. The high power battery system comprises a plurality of battery modules, each of which comprises at least one rechargeable battery cell (accumulator cell), and which are electrically connected in series via an operating current line in such manner that, during operation, an operating current flows through the operating current line.

High power battery systems are used in many mobile devices in which high capacitance is required and high currents can flow, in the range of several tens or hundreds of amperes. Examples of the use of high power battery systems are mobile tools, or even vehicles, particularly electric vehicles, in which maximum currents are usually generated in the range from 100 A to about 400 A. But a high power battery system is also necessary in other electrical devices, particularly in devices that comprise a motor and require high currents to start the motor.

It is known from the prior art that when battery systems are used individual battery cells have to be monitored to avoid the risks of damaging or destroying the batteries that may occur for example due to overcharging or because of faults within the battery.

In order to prevent overcharging of individual cells in a battery system including a plurality of rechargeable batteries, German Patent No. DE 10 2004 013 351 A1 suggests a device for distributing the charge and monitoring a plurality of rechargeable batteries connected in series. The individual rechargeable batteries are monitored by recording the incident voltage, the voltage gradient, and the temperature during charging. If a fault occurs, the corresponding rechargeable battery is bypassed via a variable impedance, which interrupts or reduces the charge current supply and a bypass is activated.

Dangerous states may arise not only when charging, particularly due to over-charging, but also during operation. It is known from the prior art that various operating states of batteries and battery systems must be monitored, and a defective battery must be isolated from a battery system as soon as a defective state occurs. One suggestion for such a battery management system is disclosed for example in US Patent No. US 2008/0084182 A1.

US Patent No. US 2007/0212596 relates to a safety shutoff for battery systems comprising one or more battery cells, particularly with lithium ion batteries, when certain monitored parameters deviate from target values. For example, the batteries' temperature is checked. All cells may be disconnected electronically if at least one of the cells exceeds a predetermined temperature. Alternatively or additionally, a monitoring device may monitor the charge status and charge cycle of the cells. The voltage and/or the internal impedance of electrochemical cells may also be monitored.

US Patent No. US 2002/0074861 A1 suggests a device for disconnecting a battery in a vehicle. In the event of a fault, if a short-circuit, a fire, an accident or similar situation threatens the safety of the vehicle or its occupants, the battery in the vehicle is disconnected. It is further provided that the shut-off device is able to be activated and deactivated, thus preventing the vehicle from being completely immobilized. Alternatively, a capacitor is provided to ensure that the battery is not entirely without a voltage supply even if a short-circuit or drop in voltage occurs, so that a safety shut-off can be effected. This safety shut-off is preferably assured via a transistor that functions as a switch to disconnect the battery.

In many fields where batteries are used, for example in electric cars, the battery must be disconnected reliably and as soon as possible in the event of a fault. For this reason, in the state of the art a high current switch that is capable of handling the high operating currents of the battery is used to disconnect or bypass the defective battery. However, the drawback of a high current switch is that it is very expensive. Also, a separate high current switch must be used for each battery or battery cell. This multiplies these costs correspondingly, particularly when a large number of battery cells are used in electric vehicles.

Besides the use of high current switches, it is also known to destroy the supply line or the operating current line of an individual battery cell, for example by blasting it off, so that it is at least disconnected in the event of a serious fault.

In this context, the object of the invention is to suggest an improved high power battery system in which individual battery modules may be monitored, and disconnected if a fault state is detected.

This problem is solved by a high power battery system having the features of claim 1, and by a method for controlling a high power battery system having the features of claim 15. The subclaims refer back to the respective independent claims and describe preferred non-evident embodiments of the high power battery system according to the invention and of the method according to the invention respectively.

A high operating current flows in the high power battery system according to the invention. Its maximum value is usually at least in the range of several tens of amperes, and often in the range from 100 to about 400 A. The operating current is a charge current, at which the high power battery system is charged, or a discharge current, at which energy is drained from the high power battery system. In the context of the invention, the term "high operating current" is understood to mean a charge or discharge current in the order of at least 10 A, and preferably at least 20 A. High power battery systems of such kind lend themselves particularly to use in vehicle drivetrains, for example for electrically powered vehicles. The description hereafter will refer to a high power battery system for vehicle drivetrains, and the invention will be explained in greater detail with reference to a drivetrain and electric vehicle of such kind without limiting the general application thereof.

The high power battery system comprises a battery system monitoring electronics and a plurality of battery modules. Each battery module includes at least one rechargeable battery cell. A battery cell, which is a closed unit, may store or emit electrical energy, that is to say the battery cell may be charged or discharged. To do this, active materials are needed which are contained in the cell. For the purposes of the invention, active materials are electrochemically effective substances of a positive or negative electrode that engage in an oxidizing or reducing reaction during charging and discharging. The electrodes must be electrically isolated from each other inside the battery cell. However, the transport of ions between the electrodes must be assured by a suitable electrolyte.

In a lithium ion battery cell, for example, the active materials are materials that enable the reversible take-up or loss of charge-bearing lithium ions. These are primary components of the positive or negative electrode. For example, the positive electrode may contain lithium cobalt oxide. During charging, lithium ions are given off by the electrode and the cobalt ions are oxidized. The negative electrode contains carbon, for example, which is reduced when the cell is charged, and in the process accepts lithium ions. The electrolyte consists of an organic solvent or solvent mixture and a conducting salt.

The battery cell according to the invention contains the electrolyte and the active materials. Neither the active materials nor the electrolyte are replenished, added or drawn off while the battery cell is in operation. In other words, neither electrolyte nor active materials are added or subtracted, and the quantity of materials present in the battery cell is not influenced in any way from the outside during a charging or discharging process in which current flows either into or out of the battery cell. The cell contains all of the components necessary for storing energy, and to enable it to be charged and discharged.

In a preferred embodiment, the battery cell has a housing that contains the active materials and the electrolyte. The housing is closed in such manner that neither the active materials nor the electrolyte can be removed or replenished while the cell is in operation.

A battery cell includes at least one electrode pair including a positive and a negative electrode. In its simplest configuration, a battery cell thus comprises only two electrodes. For example, in cylindrical cells one negative and one positive electrode are wound together in the form of a roll. The battery cell preferable has a housing with one connection for each electrode. However, it is also possible for multiple positive and negative electrodes to be contained in one battery cell. Typical for battery cells of such kind is a construction of several layers arranged one on top of the other or beside one another, and whose surface area is significantly larger than the thickness thereof. They have approximately the same surface areas and are arranged in the manner of a sandwich inside the battery cell. For example, prismatic battery cells, with a cuboid housing are common. Typically, both the positive and the negative electrodes are connected in parallel inside the battery cell.

The battery cell has two connections (terminals), wherein one connector provides the contact with one or more positive and the other connector provides the contact with one or more negative electrodes, so that the battery cell is able to be incorporated in an electrical circuit.

The plurality of battery modules in the high power battery system is electrically connected in series to an operating current line, so that when the high power battery system is working, the operating current (discharge current or charge current) flows through the operating current line. The operating current line connects at least two adjacent battery modules. But for the purposes of the invention, the term operating current line is also used to designate the line inside the high power battery system that leads to the battery system's load connections.

At least one of the battery modules in the high power battery system is constructed as a bypass battery module. It comprises a bypass switch and a bypass line. The bypass switch is designed so that, when it is in a normal operating position, the operating current flows through the associated (bypass) battery module. The bypass line is designed and arranged such that when the bypass switch has been switched from the normal operating position to a bypass position, the bypass battery module is electrically bypassed through the bypass line. When the switch is in the bypass position, the operating current flows through the bypass line and not through the bypass battery module, as before, so a battery cell is not short-circuited externally. The high power battery system comprises a module monitoring unit for each bypass battery module. This module monitoring unit monitors the associated bypass battery module and detects a fault state in the module.

The method according to the invention comprises the following steps:

The bypass battery modules in the system are monitored via the module monitoring unit of the high power battery system. When a fault state occurs in one of the battery modules, this state is detected. The battery system monitoring electronics measures the flow of current in the operating current line. If a battery module is faulty, a check is then made to determine whether the current flow in the operating current circuit is lower than a predetermined limit value, which is usually defined according to the high power battery system bypass switch that is being used. As soon as the current flow falls below the limit value, the bypass switch is switched from a normal operating position to a bypass position. As a result, the (associated) bypass battery module for which the fault state was detected is electrically bypassed such that the operating current flows through the bypass line. In this case, therefore, the operating current no longer flows through the faulty battery module, bypassing it instead. The operating current continues to flow through the undamaged battery modules in the high power battery system.

The high-power battery system according to the invention has the advantage that an external short circuit via the bypass switch is prevented by the detection of a fault status. The bypass switch is constructed and designed in such a manner that in the event of a fault the faulty battery module is not bypassed via the battery module connectors, but the operating current is diverted through the separate bypass line instead. Consequently, the battery module is no longer part of the high-power battery system's power circuit, having been decoupled therefrom. This means that if the battery module only comprises one battery cell, this battery cell is decoupled. In this way it is ensured that none of the battery cells is short circuited externally, that is to say a short circuit cannot be created between their connection terminals.

Bypassing the faulty battery module via the battery module connections would cause an external short circuit of the module. If an external short circuit occurs in a battery module or an electrochemical battery cell, all of the energy stored in the battery cell is discharged, similarly to an internal short circuit. For example, it is known that in conventional lithium ion cells with organic electrolyte solution internal short circuits have given rise to states in which the spontaneous release of energy has caused the cell to explode and catch fire. Accordingly, a short circuit in any kind of battery that contains electrochemically active materials is generally to be avoided. Such an occurrence may be prevented reliably with the battery switch according to the invention and the modified routing of the current via the bypass line.

The battery system monitoring electronics includes all module monitoring units for the battery modules that are to be monitored, and any other components as well. The battery system monitoring electronics provides all of the functions that are essential for monitoring and controlling the high power battery system. In particular, it may include a microprocessor or other hardware. Some of its functions may be assured via software. It is preferably also able to carry out additional functions, for example for communicating with modules or components outside the high power battery system.

When an error state is detected for a battery bypass module, the current flow in the operating current line is measured via the battery system monitoring electronics. This detection is performed by a component of the battery system monitoring electronics. It is preferably effected via the module monitoring unit of the defective battery module. In this context, the individual module monitoring units are able to function autarkically and independently of each other. They may be configured so as to measure the current flow, make a comparison with the predefined limit value, and/or actuate the bypass switch so that it switches from the normal operating position to the bypass position. In this case, each one preferably has its own microprocessor. Alternatively, some or all of these functions may also be performed by a separate component of the battery system monitoring electronics.

The module monitoring units may also have the form of hardware, and optionally software in some cases. Of course, the electronic components may be combined in one or more assemblies depending on the requirements. In particular, a module monitoring unit may be assigned as a separate assembly to each battery module. For example, the module monitoring units may transfer the measured current flow in the operating current line to a component (the microprocessor, for example) of the battery system monitoring electronics, so that the microprocessor of the battery system monitoring electronics performs the comparison with the predefined limit value, which is stored for example in a memory of the battery system monitoring electronics.

Except for the sensors they need, the module monitoring units are preferably integrated in the central unit of the battery system monitoring electronics. Spatial integration may be advantageous, because this makes a very compact structure possible, and a plurality of module monitoring units may be combined. In this embodiment, the battery modules only have the sensors that are essential for recording a fault state (for example, a temperature sensor). The measurement values undergo further processing in the central unit of the battery system monitoring electronics.

Each module monitoring unit monitors an allocated battery module and detects a fault state if it occurs. A fault state of a battery module may be deviation of an operating parameter or operating value from a standard value or a reference value. A technical fault or defect such as overheating, a leak, or the existence of excessive pressure on the battery module is also categorized as a fault state. Individual parameters such as the voltage, the current, the charge cycle or the temperature may be measured or observed and compared with reference values for the purpose of monitoring the battery module. A fault state is detected as soon as a monitored measurement value deviates from a reference value and falls outside a tolerance range to such an extent that there is a danger that the battery cell or the battery module may be damaged, or may catch fire or explode. Fault detection and the necessary sensors are known to a person skilled in the art, for example from the related art, particularly from German Patent No. DE 10 2004 013 351 A1.

In a particularly preferred embodiment, the battery cells of the high power battery system are alkali metal cells. Their active metal is a metal from the chemical group of alkali metals, preferably lithium. For example, the lithium ion battery cells whose use is so widespread may be used to good effect. However, alkali metal cells or lithium cells in which the electrolyte is based on $SO_2$ are particularly preferred. Compared with the lithium ion cells with organic electrolytes that are in common use, a lithium ion cell with an $SO_2$ electrolyte exhibits greater functional reliability among other advantages.

The high power battery system of an electric vehicle is operated in highly inconstant manner. Under conditions of constant driving and acceleration, current is drawn from the battery system, causing a discharge current to flow to the drive motor of the electric vehicle. When the vehicle is braked, braking energy is used to charge the battery system, causing a charging current to flow to the high power battery system. Changing between driving operation and braking operation repeatedly gives rise to operating states in which the current flowing in the supply line between the electric motor and the battery system is low. The operating current often falls to zero, so that the high power battery system is de-energized. Accordingly, when electric vehicle drivetrains are operated in real conditions, operating states often occur in which the operating current in the operating current line is below the limit value. These states exist for a period that is long enough to cause the bypass switch to switch and to bypass a faulty battery module.

The invention exploits this realization. When a fault in the battery module is detected by one of the module monitoring units, preferably the battery system monitoring electronics measures the flow of current in the operating current line and causes the bypass switch for the battery module in question to switch from the normal operation position to the bypass position at the time when the current flow in the operating current line is lower than a predetermined limit value.

Depending on the requirements of the individual case, a battery module should be disconnected within a relatively short time, preferably less than a minute, particularly preferably within a few seconds (not more than ten seconds). To do this, the bypass is switched so as to electrically decouple the faulty module and ensure the current flow through the other (undamaged) battery modules. It is not possible to guarantee in all cases that an operating state with an operating current below the limit value will occur within the desired period. This state may also be deliberately induced. To do this, the entire high power battery system with the battery modules may be briefly disconnected from the load or the charge (for example from the electric motor). This disconnection lasts until the bypass switch of the system has switched over and the defective battery module has been bypassed.

In a preferred embodiment of the high power battery system (high current battery system), a load current drive is used to produce this low-current operating state, in which the operating current in the battery system is lower than the limit value. This current drive controls the flow of current between the high power battery system and the load in such manner that the current in the operating current line is below the limit value. In the context of the invention, it was discovered that the electric motor control unit present in an electric vehicle may be advantageously used for this purpose by causing it to adjust a target value that is generated by an electronic gas pedal as the sender. The electric motor control unit adjusts the vehicle's electric motor in such manner that current is drawn from the high power battery system during driving and acceleration conditions. During braking, current is generated by the electric motor and supplied to the battery system. When freewheeling, the motor is decoupled from the high power battery system. The necessary high performance electronic elements are already present in an electric vehicle as components of the electric motor control unit.

In the context of the invention, it was discovered that the high performance electronic elements of the electric motor control unit already present in the vehicle may be used to decouple the high power battery system from the load as is necessary for the purposes of the invention. The disconnection only has to take place long enough for the bypass switch to be switched and the faulty battery modules to be bypassed. This brief disconnection preferably lasts less than a second, particularly preferably less than 100 milliseconds, especially preferably less than 20 milliseconds. Thus, the user normally barely notices it, if at all, even when the electric vehicle is being driven.

Alternatively, instead of disconnecting the load from the high power battery system entirely, the electric motor control unit may reduce the load current such that the operating current in the high power battery system falls below the necessary limit value. Limiting of such kind may be effected by phase angle control in the motor, by current pulsing or current chopping, or by any similar method known to one skilled in the art.

When an electric vehicle is being driven, a current of up to 400 A normally flows during acceleration. If a bypass were to be activated with the vehicle in driving or accelerating mode, that is to say while it is under load, there is great danger of breakaway arcing or sparkover. Since the battery module is already faulty, and has one or more faulty cells, there is a risk that such sparks might ignite a fire and cause yet more damage.

With the safety shut-off according to the invention, a faulty battery module is not disconnected under load, but in a state in which the operating current in the operating current line is low. When the bypass switch is switched over, the operating current is preferably less than 1 A, particularly preferably close to zero amperes. In particular, the bypass switch is then easier to switch, because only relatively small currents that are (far) below the operating current have to be switched. At any rate, the operating current should be lower than a predetermined limit value, which is dependent on the bypass switch being used.

Switching small currents (less than 1 A) has the advantage that arcing or sparking does not occur, as is the case when the current is in the range of several tens or at least 100 amperes. Consequently, there is no need for arc quenching. In a preferred embodiment of the high power battery system, the predetermined limit value for the current flow is selected such that it is no more than 0.5 A, preferably no more than 0.2 A, particularly preferably no more than 0.1 A. In general, it is also possible to set the predetermined limit value at 2 A, 5 A or 10 A. The bypass switch must then be adjusted accordingly.

With a predetermined limit value not exceeding 1 A, a simple switch may be used, and it does not have to be a high load or high power switch. Since these simple switches are less expensive than high load or high power switches, this represents a significant cost savings. For example, magnetic switches, a simple relay, or other simple switches may be used. The only criterion the switch must satisfy is that it must be able to reliably divert the operating current in the high power battery module without faults in the "closed" state that is to say, when it is in the normal operating position or the bypass position.

A preferred embodiment of the battery system according to the invention will be explained in greater detail with reference to the following figures, but without limitation to the general applicability thereof. The special features described therein may occur individually or in combination. In the figures.

Figure 1:
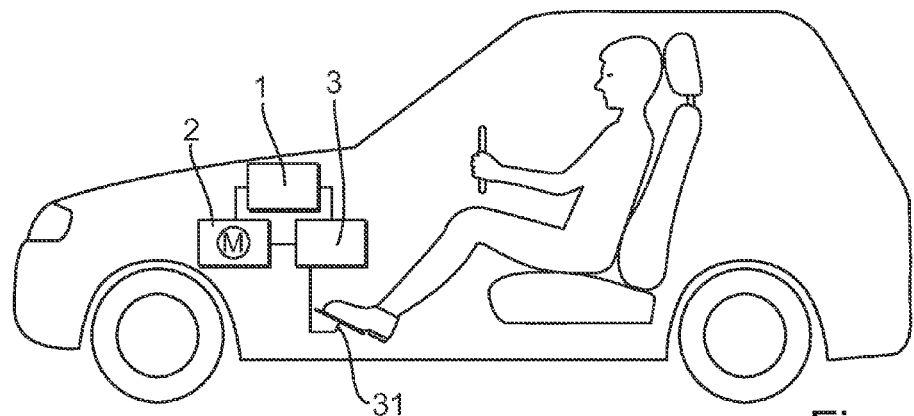
FIG. 1 shows a general view of an electric vehicle having an electric motor, a high power battery system, and an electric motor control unit.

FIG. 1 shows an electric vehicle with a high power battery system 1 (high current battery system) according to the invention, an electric motor 2, and an electric motor control unit 3, which controls electric motor 2. A sender 31 for electric motor control unit 3 has the form of an electronic gas pedal. However, sender 31 might also be a manual controller or similar. When the electric vehicle is being operated, more or less energy is drawn from high power battery system 1 and supplied to electric motor 2 depending on the position of electronic "gas pedal" 31. The current flow is commensurate. When bypass battery module 6 is determined to have a fault state, a load current flowing between high power battery system 1 and electric motor 2 is preferably controlled via electric motor control unit 3 in such manner that a current flowing between a plurality of battery modules 4 in an operating current line 5 of high power battery system 1 is below a predetermined value. The load current is thus throttled, so that the faulty battery module may subsequently be disconnected. Because of this control, it is then possible to deliberately induce an operating state that occurs spontaneously while the vehicle is being driven, in which state a low current, preferably less than 1 A, flows in high power battery system 1. In this way, a faulty module may be immediately disconnected when a fault is detected in the battery module. The system does not have to wait until the "low current state" with an operating current below the limit value occurs in due course.

Figure 2:
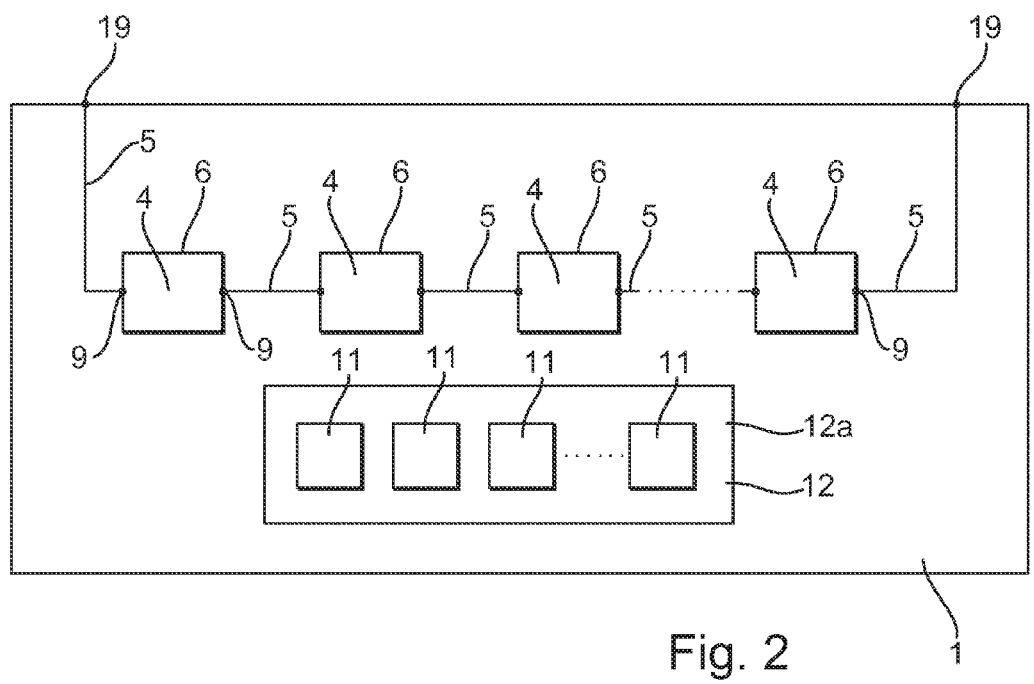
FIG. 2 shows a high power battery system according to the invention with a plurality of battery modules and at least one bypass battery module.
Figure 3:
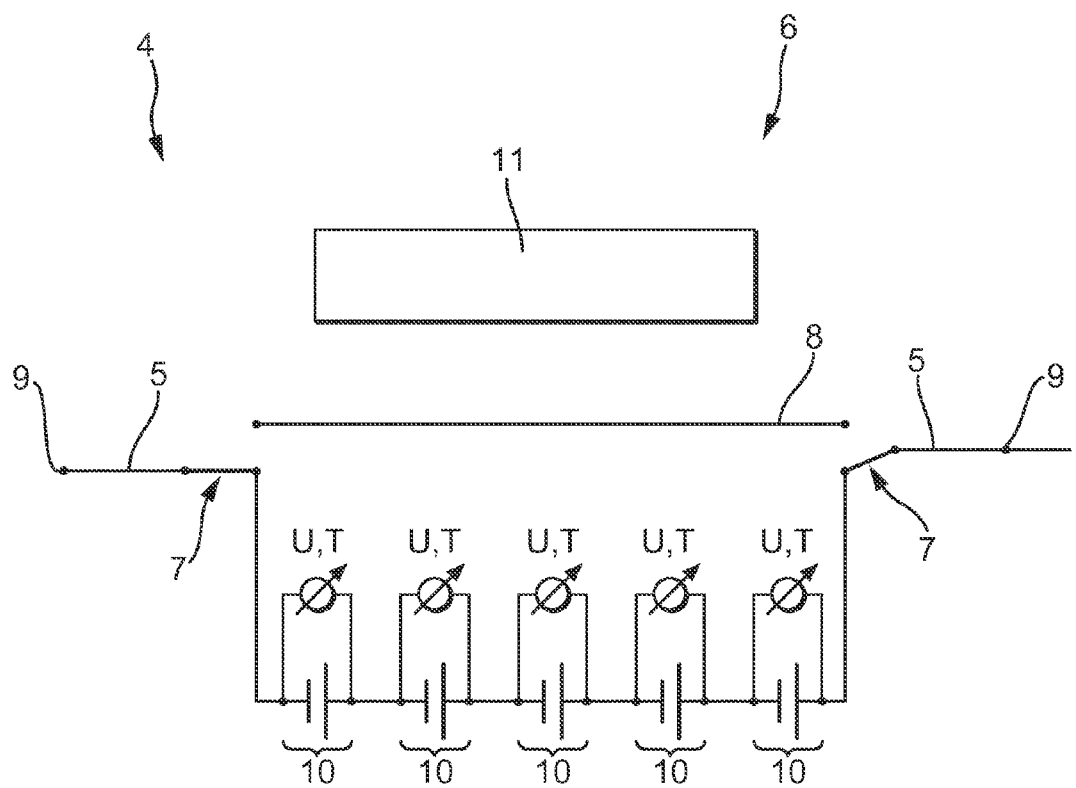
FIG. 3 shows a detailed view of a bypass battery module having a plurality of individual cells.

In FIGS. 2 and 3, high power battery system 1 according to the invention is shown in detail. It comprises a plurality of rechargeable battery modules 4 that are connected in series. An operating current line 5 connects series-connected battery modules 4 in such manner that an operating current is able to flow through battery modules 4. The battery modules form a module chain. In an alternative embodiment, more than one (for example two) module chains may be connected in parallel with a plurality of battery modules 4.

FIG. 2 shows that all battery modules 4 are constructed as a bypass battery module 6, and each has a bypass switch 7 and a bypass line 8. Bypass battery modules 6 may be switched via bypass switch 7 so that when switch 7 is in a bypass position the operating current in operating current line 5 flows through bypass line 8 and bypass battery module 6 is bypassed when a fault state in bypass battery module 6 occurs and is detected (FIG. 3).

In a preferred embodiment, high power battery system 1 has at least three, preferably at least five bypass battery modules 6. An embodiment with at least ten bypass battery modules 6 is particularly preferred. A number of 16 bypass battery modules in a high power battery system has proven most advantageous for practical use in an electric vehicle. The greater the number of series-connected bypass battery modules 6, the less the effect of a battery module 6 that is faulty and must be bypassed. The total capacity of high power battery system 1 is reduced in proportion to faulty battery modules 6. The high power battery system 1 according to the invention has the advantage that besides enabling the individual battery modules 6 to be easily monitored, vehicle operation may also be resumed without difficulty if only one or a small number of battery modules 6 fails.

In a preferred embodiment, battery modules 4 have a plurality of battery cells 10, which are connected in series. An embodiment having six battery cells 10 (FIG. 3) is preferred. The voltage of the individual battery cells 10 is preferably to be selected such that the battery module has a total voltage less than 25V. For example, each cell may have a voltage of 4 V if a total of six battery cells 10 are combined in a module.

Of course, other voltages and/or a different number of battery cells are possible. The important point is that the total voltage should be below 25 V so that the battery module only has a very small safety voltage (Safety Extra Low Voltage SELV), so that service technicians, or in the event of an accident rescue personnel for example, may be able to examine the battery modules without danger to themselves. All bypass circuits are preferably able to be triggered by a service technician, so that the high power battery system then consists of nothing more than individual battery modules that are separate from each other, and the voltage of which is less than 25 V. In the event of an accident, the bypass switch should be triggered automatically to disconnect the modules from each other. This may be coupled to the airbag deployment, for example.

One bypass switch 7 is preferably arranged as a diverter on each of two connection terminals 9 of bypass battery module 6, connecting the battery module to operating current line 5. Bypass line 8 is configured parallel to battery cells 10 of bypass battery module 6. If a fault is detected in bypass battery module 6 and the absolute value of the current flowing in operating current line 5 is less than the predetermined limit value, both bypass switches 7 are switched from the normal operating position shown here into the bypass position, in which the two switches 7 connect bypass line 8 with operating current line 5.

The level of the limit value depends on the maximum switching current of bypass switch 7 for which it is possible to reliably switch selected switch 7 without damaging it (for example by overheating) and without causing spark-over or breakaway arcing.

Of course, it is possible to configure bypass battery module 6 with only one bypass switch 7. The second bypass switch 7 is then replaced with a conductive section in which bypass line 8 is connected to operating current line 5 at connection terminal 9 of battery module 6.

Module monitoring units 11 of high power battery system 1 form an battery system monitoring electronics 12. In the embodiment of high power battery system 1 shown in FIG. 2, module monitoring units 11 of bypass battery modules 6 (with the exception of the necessary sensors) are integrated in a central unit 12a of battery system monitoring electronics 12. When a fault state is detected in a battery module 4, electronic battery monitoring means 12 measures the current flow in operating current line 5. The current may be measured at any point in operating current line 5, for example between two adjacent battery modules 4, or between a connecting terminal 19 of high power battery system 1 and a battery module 4.

Figure 4:
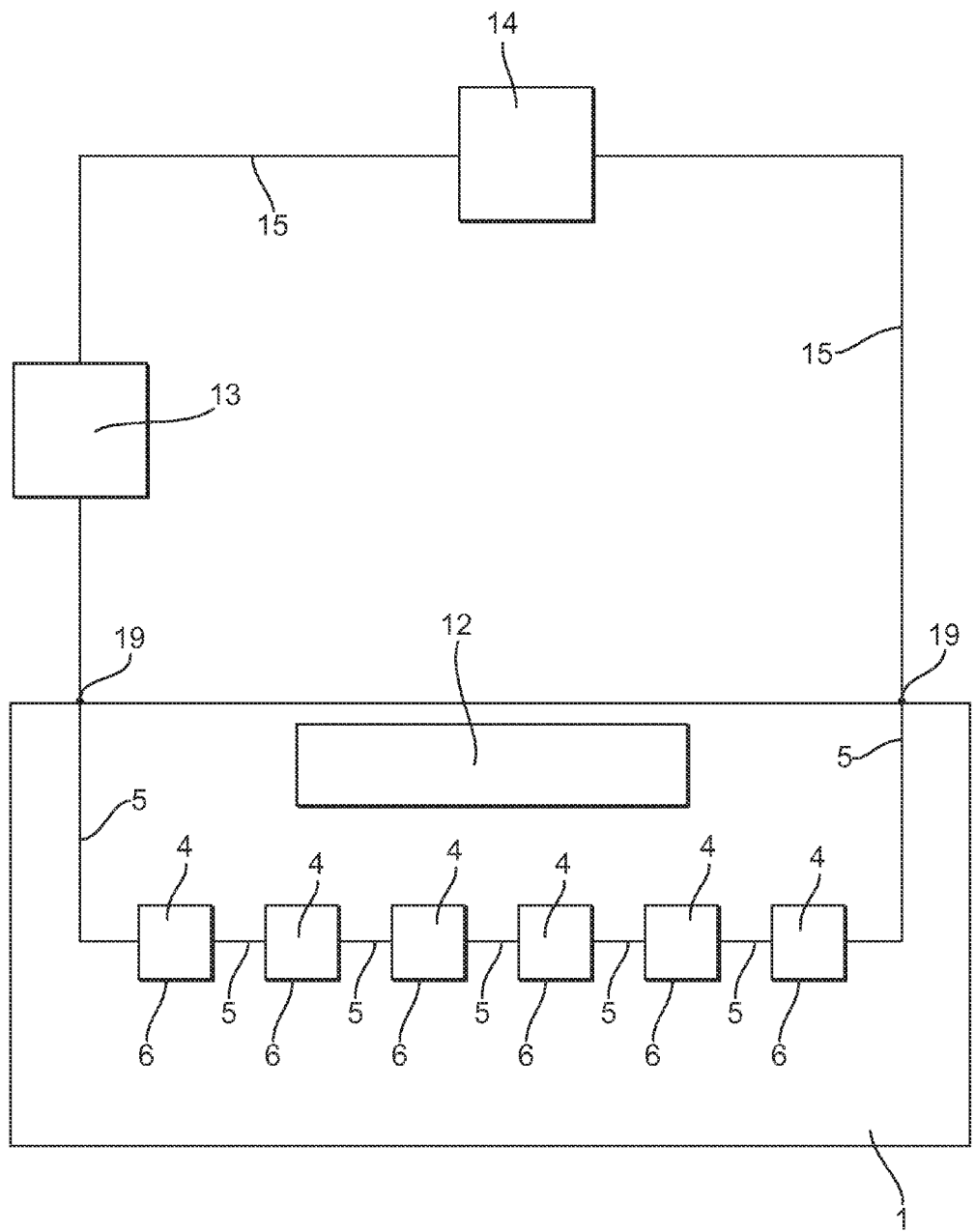
FIG. 4 shows the high power battery system of FIG. 2 with a consumer load connected.

In a preferred embodiment as shown in FIG. 4, high power battery system 1 is equipped with a load current drive 13, which controls the current flow through a consumer load 14 that is connected to high power battery system 1 via a load current line 15. When a fault state is detected in one of the bypass battery modules 6, the current flow in load current line 15 is controlled in such manner that the current flow in operating current line 5 is less than the predetermined limit value, so that bypass switch 7 of the faulty module 6 may be activated. If high power battery system 1 is being used in an electric vehicle, load current drive 13 is electric motor control unit 3. Consumer load 14 is electric motor 2, so that electric motor control unit 3 adjusts the current flow into and out of electric motor 2 accordingly. Communication between electronic battery monitoring means 12, module monitoring units 11, bypass switches 7, load current drive 13, and/or electric motor control unit 3 is assured for example via a bus system (for example a CAN bus) or other signal circuits.

As is shown in FIG. 3, each battery cell 10 is monitored by a module monitoring unit 11, which may optionally be arranged on the respective module. In order to monitor bypass battery module 6 and to check the state of bypass battery module 6 and of battery cell 10 the voltage and temperature for example are measured in battery cells 10. Alternatively, only some of the battery cells 10 or only the entire bypass battery module 6 may be monitored. If bypass battery module 6 is monitored, the temperature, voltage or current for example of battery module 6 may be recorded. Monitoring circuits of this and similar kinds are described for example in German Patent No. DE 10 2004 013 351 A1. Module monitoring unit 11 may for example also measure the current in operating current circuit 8 and/or control bypass switch 7.

In the context of the invention, different battery cells 10 may be used as components of battery modules 4. Preferably, alkali-metal cells are used, particularly cells in which the active metal is lithium. The very commonly used lithium ion battery cells may be used to advantage. However, lithium cells or other alkali metal cells with an $SO_2$-based electrolyte are particularly preferred. They differ from the standard lithium ion cells that work with organic electrolytes particularly in that they are more functionally reliable. More complete details are provided in the pertinent literature, and reference may be made for example to WO 2005/031908, WO 2009/077140, WO 2000/79631, and to the documents cited therein.

In a preferred embodiment, high power battery system 1 is constructed in such manner that battery cells 10 of individual battery modules 4 contain an $SO_2$-based electrolyte solution. Cells of such kind differ from other cells in that the electrolyte solution and other components of the battery system are fireproof. The cell does not catch fire, even in safety-critical states. A further advantage of $SO_2$ battery cells is that even if they are deeply discharged or if the polarity of an individual cell is reversed, safety-critical states do not result therefrom.

Reaction products that are formed in the event of overcharging are able to be reversibly degenerated into the components of the electrolyte solution, so that a battery cell 10 may be overcharged to a certain degree without necessitating the immediate disconnection of the module. In addition, a module with a faulty cell 10 may also be reinserted in the current circuit after a certain idle period, during which it has been disconnected from high power battery system 1, because a kind of self-recovery takes place. Battery system monitoring electronics 12 and/or module monitoring unit 11 preferably detect that the cell is functional again and switches bypass switch 7 back to the normal operating position, and thus also switch bypass battery module 6 back into the current circuit of high power battery system 1. This switching also takes place only when the operating current in operating current line 5 is below the limit value.

Figure 5:
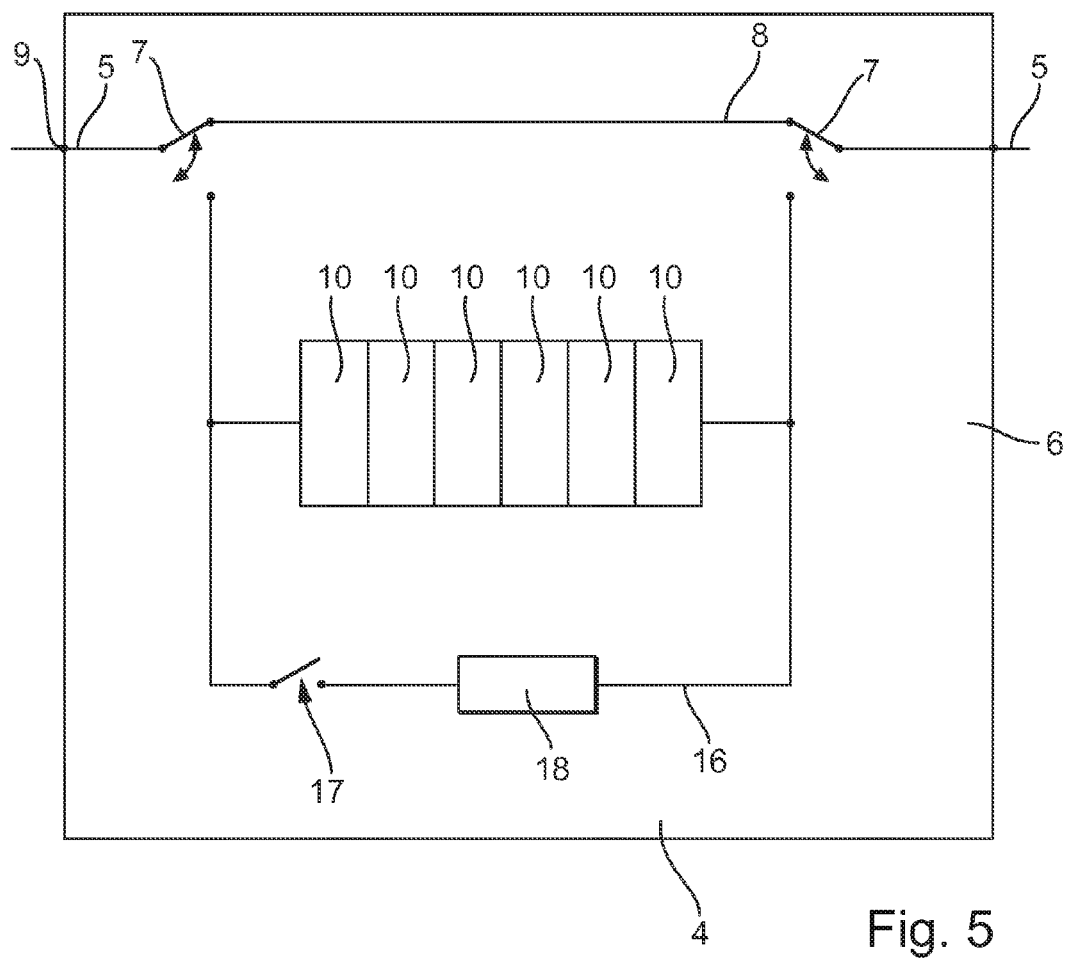
FIG. 5 shows an alternative embodiment of a bypass battery module.

In the context of the invention, it was discovered that such battery systems with $SO_2$ battery cells may also be "de-energized". In a preferred embodiment as shown in FIG. 5, bypass battery module 6 has a discharge line 16 switched in parallel to module 6, and which comprises a discharge switch 17 and a discharge resistor 18. This discharge circuit may be integrated in bypass battery module 6. As soon as discharge switch 17 is closed, battery module 4 is discharged via discharge resistor 18, until the voltage in battery module 4 has sunk to 0 V. The capacitor of battery module 6 is discharged via discharge resistor 18, the energy being converted into heat. Discharge resistor 18 must be selected such that the heat generated thereby may be conducted away (without destroying the resistor).

This de-energized state of battery module 6 enables module 6 to be handled in complete safety. When it is used in electric vehicles, the individual modules may be de-energized before the battery is replaced or any work is carried out on the electric vehicle. Accidental short-circuits, caused for example during installation or removal, can no longer occur. High power battery system 1 has the advantage that it may be entirely de-energized via the discharge circuit in the event of an accident. During transportation too, no safety-critical states can occur, since there is no voltage incident on battery modules 4. These modules 4 are extremely safe, which is particularly advantageous for air transportation.

In a preferred embodiment, discharge switch 17 is not closed until bypass switch 7 has been switched to the bypass position and battery module 6 has been decoupled from the current circuit of high power battery system 1. Accordingly, before discharge switch 17 is activated a check is made to determine whether bypass switch 7 has been switched to the bypass position, as shown in FIG. 5. Only then does discharge switch 17 switch to a closed position.

The invention claimed is:

1. A high power battery system in which a large operating current flows, particularly for vehicle drivetrains, comprising
a battery system monitoring electronics and
a plurality of battery modules, each of which comprises at least one rechargeable battery cell, and which are electrically connected in series via an operating current line in such manner that, during operation, an operating current flows through the operating current line, wherein
an electrolyte and active materials are contained in the battery cell to store electrical energy,
at least one of the battery modules is constructed as a bypass battery module, which comprises a bypass switch and a bypass line, which are designed and arranged such that when the bypass switch has been switched from a normal operating position to a bypass position, the battery module is electrically bypassed by the bypass line so that the operating current flows through the bypass line, thereby avoiding an external short circuit of the battery cell of the battery module,
the battery system monitoring electronics comprises a module monitoring unit for each bypass battery module, which unit monitors the battery module detects a fault state of the battery module, and
when a fault state of a battery module is detected by one of the module monitoring units the battery system monitoring electronics measures the current flow in the operating current line and switches the bypass switch of the battery module concerned from the normal operating position to the bypass position at a time when the current flow in the operating current line is lower than a predetermined limit value.

2. The high power battery system according to claim 1, characterized in that neither the active materials nor the electrolyte are replenished, added to or removed from the battery cell during operation of the battery cell.

3. The high power battery system according to claim 1, characterized in that the battery cell comprises a closed housing in which the electrolyte and the active materials are contained.

4. The high power battery system according to claim 1, characterized in that the module monitoring unit is integrated in the electronic battery monitoring means.

5. The high power battery system according to claim 1, characterized in that the battery module comprises a plurality of battery cells, which are connected in series.

6. The high power battery system according to claim 1, characterized in that the battery module comprises six battery cells, which are connected in series.

7. The high power battery system according to claim 1, characterized in that it comprises at least three bypass battery modules.

8. The high power battery system according to claim 1, characterized in that it comprises at least five bypass battery modules.

9. The high power battery system according to claim 1, characterized in that it comprises at least ten bypass battery modules.

10. The high power battery system according to claim 1, characterized in that the predetermined limit value of the current flow is not greater than 1 A.

11. The high power battery system according to claim 1, characterized in that the predetermined limit value of the current flow is not greater than 0.5 A.

12. The high power battery system according to claim 1, characterized in that the predetermined limit value of the current flow is not greater than 0.1 A.

13. The high power battery system according to claim 1, characterized in that the bypass switch is a magnetic switch.

14. The high power battery system according to claim 1, characterized in that the battery cell contains a $SO_2$-based electrolyte.

15. The high power battery system according to claim 1, characterized in that the battery module comprises a discharge line switched parallel to the battery module, having a discharge resistor and discharge switch.

16. The high power battery system according to claim 15, characterized in that the discharge line is not closed by the discharge switch until the bypass switch is in the bypass position and the battery module has been electrically bypassed by the bypass line, so that the operating current is flowing through the bypass line.

17. The high power battery system according to claim 1, characterized by a load current drive for controlling the current flow via a consumer load connected to the high power battery system in such manner that the current flow through the operating current line of the high power battery system is smaller than the predetermined limit value.

18. An electric vehicle having an electric motor, an electric motor control unit for controlling the electric motor, and having a high power battery system, characterized in that the high power battery system is designed in accordance with claim 1.

19. The electric vehicle according to claim 18, characterized in that a load current flowing between the high power battery system and the electric motor is controllable with the electric motor control unit such that the current flowing in the operating current line of the high power battery system is less than the predetermined limit value.

20. A method for controlling a high power battery system, particularly a high power battery system according to claim 1, having
an electronic battery monitoring means and
a plurality of battery modules, each of which comprises at least one rechargeable battery cell, and which are electrically connected in series via an operating current line such that during operation an operating current flows through the operating current circuit, wherein
an electrolyte and active materials are contained in the battery cell to store electrical energy, at least one of the battery modules is constructed as a bypass battery module, which comprises a bypass switch and a bypass line that is switched in parallel with the battery module, and
the high power battery system comprises one module monitoring unit for each bypass battery module,
characterized by the following steps:
- a) monitoring the battery module via the module monitoring unit;
- b) detecting a fault state of the battery module;
- c) measuring the current flow in the operating current line by means of the battery system monitoring electronics when a fault state of a battery module is detected by one of the module monitoring units;
- d) checking whether the measured current flow in the operating current line is smaller than a predetermined limit value;
- e) if the measured current flow is smaller than the predetermined limit value, switching the bypass switch from a normal operation position to a bypass position, such that the battery module for which a fault state was detected is electrically bypassed by the bypass line and the operating current flows through the bypass line, thereby avoiding an external short circuit of the battery cell.

21. The method for controlling a high power battery system according to claim 20, wherein the high power battery system comprises a load current drive for controlling the current flow through a consumer load connected to the high power battery system,
characterized by the further step:
limiting the current flow in the high power battery system via the load current drive such that the current flow in the operating current line of the high power battery system is smaller than the predetermined limit value.

22. The method according to claim 20, wherein the battery module comprises a discharge switch and a discharge resistor that is arranged in a discharge line that is electrically parallel to the battery module, and the discharge switch is arranged in the discharge line,
characterized by the further step:
- checking whether the bypass switch is switched to the bypass position such that the battery module is bypassed by the bypass line, and the operating current flows through the bypass line;
- switching the discharge switch to a closed position such that the load circuit is closed by the discharge line;
- discharging the battery module through the discharge resistor via a current flow from the battery module into the discharge resistor.

* * * * *